United States Patent Office 2,766,204
Patented Oct. 9, 1956

2,766,204
METHOD FOR DECONTAMINATION OF RADIO-ACTIVELY CONTAMINATED AQUEOUS SOLUTION

Charles S. Lowe, Niagara Falls, N. Y., assignor to the United States of America as represented by the United States Atomic Energy Commission No Drawing. Application September 29, 1954, Serial No. 459,218

2 Claims. (Cl. 210—23)

My invention relates to a method of decontaminating a radioactively contaminated aqueous solution. More particularly, my invention relates to a method of decontaminating an aqueous solution of nuclear fission products.

The disposal of large volumes of radioactive aqueous waste solutions from production processes at various atomic development sites is one of the most critical problems of the whole atomic energy program. Direct discharge of extremely active solutions into rivers and streams is dangerous to plant and animal life. Burial of large volumes of these solutions creates considerable handling problems, and is cumbersome and costly. Attention has, therefore, been directed towards removal of the radioactive constituents of the solutions, which actually comprise only a small percentages of the overall volume. The separated radioactive constituents might then be conveniently stored, while the gross amounts of decontaminated solution could be safely evaporated or otherwise passed to the environment.

One of the prior art methods for the decontamination of radioactive waste solutions involved ion-exchange. While ion-exchange processes have been successful in the treatment of solutions of relatively low concentration, generally of the order of a few parts per million or less, they have proved impractical for the removal of nuclear fission products from waste solutions of a high non-radioactive salt content.

Another prior art method involved the removal of activity from solutions by plating or scrubbing actions of metals such as iron in a finely divided form. Other adsorption methods employed silica gel and activated aluminum. Generally, adsorption methods were effective in removing particular radioisotopes, but great reductions in the overall radioactivity level of the waste solutions could not be obtained.

An object of my invention, therefore, is to provide a method for the decontamination of a radioactively-contaminated aqueous solution.

Another object is to provide a method for the decontamination of an aqueous solution of nuclear fission products in which an extremely high volume reduction factor is obtainable.

Another object is to provide a relatively rapid, manageable method for the decontamination of an aqueous solution of nuclear fission products in which the radioactivity level of the solution is reduced sufficiently to permit safe discharge to the environment.

Other objects and advantages of my invention will become apparent from the following detailed description and the claims appended hereto.

In accordance with my present invention, a radioactively-contaminated aqueous solution may be decontaminated by sequentially contacting said solution with a plurality of insoluble inorganic compounds of the group consisting of FeS, Fe(OH)$_2$ and Ca$_3$(PO$_4$)$_2$.

My invention is applicable to the decontamination of radioactively-contaminated solutions generally, but is particularly applicable to the decontamination of aqueous waste solutions from radiochemical processes for the separation of uranium and/or plutonium from nuclear fission products. The process is rapid, the cost per gallon compares extremely favorably with other decontamination processes, and the volume of the final radioactive solution for burial is only half that of the best of prior art methods. After separation of the radioactive constituents, the resulting solutions may be safely, and without danger to animal and vegetable life, passed to the environment by evaporation, discharge into streams, or by other means.

The sequence in which the insoluble inorganic compounds are contacted with the contaminated solution may vary, while yet achieving satisfactory decontamination. However, I find that particularly fine results may be obtained by first contacting the contaminated solution with FeS separately, and then concurrently with Fe(OH)$_2$ and Ca$_3$(PO$_4$)$_2$. Furthermore, although the insoluble compounds may be added preformed to the solution, I prefer to form them within the solution. Therefore, for clarity in presentation, my invention will hereinafter be illustrated specifically with respect to insoluble compound formation within solution and precipitation therefrom.

The FeS may be satisfactorily precipitated over a fairly wide pH range, including both acidic and basic pH values. Nonetheless, I unexpectedly find that vastly superior results may be obtained by conducting the precipitation within a relatively narrow pH range. Thus, approximately pH 3.6–4.4 is particularly satisfactory, while approximately pH 4.0 is preferred. Table I below shows the efficiency of the ferrous sulfide precipitation as a function of pH in terms of the decontamination factor (i. e., original solution radioactivity count divided by final count) obtained.

TABLE I
*Efficiency of FeS precipitation as a function of pH*

|  | FeS Precipitation pH | | | | | | |
| --- | --- | --- | --- | --- | --- | --- | --- |
|  | 3.5 | 3.6 | 4.0 | 4.2 | 5.0 | 6.0 | 10 |
| Decontamination Factor | 10 | 40 | 61 | 52 | 38 | 28 | 8 |

That optimum decontamination is obtainable at approximately pH 4 is startling because, employing the conditions herein described, all the iron would not completely precipitate as the sulfide until approximately pH 6, but yet more activity is carried by the relatively smaller FeS precipitate at pH 4.

The pH at which the FeS precipitation is performed not only affects the efficiency of that particular precipitation, but it also greatly affects all subsequent steps beyond the merely additive manner one might expect. Thus, Table II, below, shows the decontamination factor for an entire FeS, Fe(OH)$_2$—Ca$_3$(PO$_4$)$_2$ cycle as a function of the pH at which FeS is precipitated.

TABLE II
*One cycle decontamination factor as a function of FeS precipitation pH*

|  | FeS Precipitation pH | | | | | | |
| --- | --- | --- | --- | --- | --- | --- | --- |
|  | 3.5 | 4.0 | 4.3 | 4.5 | 5.1 | 5.6 | 6.0 |
| One Cycle Decontamination Factor | 190 | 325 | 300 | 250 | 110 | 60 | 50 |

When relatively strongly acidic wastes are being decontaminated (virtually all aqueous waste solutions of uranium fission products have an acidity of less than approximately pH 1) not only is approximately pH 4 optimum for the FeS precipitation, but the manner in which this pH is obtained is vital for optimum results. Thus, I unexpectedly find that if an initial acidity adjustment is made to approximately pH 1.0, greatly superior decontamination is obtained in the following ferrous sulfide precipitation. Any inorganic basic reagent, such as an alkali hydroxide or an alkali carbonate is suitable for this adjustment. Likewise, it is important that a solution of greater initial basicity than approximately pH 1 be acidified to this value prior to further treatment in accordance with my invention, and any aqueous mineral acid, such as $HNO_3$, is suitable for this acidification. Table III, below, shows the tremendous importance of the initial pH adjustment to pH 1 to decontamination obtained with ferrous sulfide.

TABLE III

*The effect of initial pH adjustment on decontamination by ferrous sulfide*

| Initial pH Adjustment | Activity | |
|---|---|---|
| | Initial (cts./min./ml.×$10^7$) | Final (cts./min./ml.×$10^5$) |
| 0 | 3.4 | 8.74 |
| 0.5 | 3.4 | 7.77 |
| 1.0 | 3.4 | 7.6 |
| 1.5 | 3.4 | 41.2 |
| 2.0 | 3.4 | 191 |
| 2.5 | 3.4 | 199 |
| 3.0 | 3.4 | 210 |

After the contaminated solution is initially adjusted to approximately pH 1, I then prefer to continue the neutralization to approximately pH 4 with a basic sulfide salt, such as the ammonium or an alkali salt, sodium sulfide being preferred. For this purpose approximately 3.9 milligrams $Na_2S$/ml. is suitable. This procedure is preferred because in addition to accomplishing neutralization, sulfide ion for FeS formation is provided.

The provision of at least approximately 0.5 milligram ferrous ion per milliliter in the waste solution prior to the FeS precipitation is satisfactory, while approximately 1 mg. ferrous ion/ml. is preferred. Although concentrations of iron greater than approximately 1 mg./ml. may be used, they do not offer significant improvement in activity removal while unnecessarily increasing process costs and final amounts of wastes for storage. The iron may be added to the waste solution as any water soluble ferrous salt, such as $FeCl_2$ or $FeBr_2$, while $FeSO_4$ is preferred. The iron may be satisfactorily added prior to, or after the initial pH adjustment, or after the subsequent adjustment to pH 4 with alkali sulfide, but I prefer to add it after the initial pH adjustment. Table IV, below, shows the gross activity remaining in an aqueous waste solution after the precipitation of FeS at pH 4 from solutions provided with different amounts of $Fe^{++}$.

TABLE IV

*The effect of varying amounts of iron on FeS precipitation at pH 4*

| Iron Addition (mg. $Fe^{++}$/ml.) | Activity | |
|---|---|---|
| | Initial (cts./min./ml.×$10^7$) | Final (cts./min./ml.×$10^5$) |
| 0.45 | 3.4 | 3.2 |
| 0.50 | 3.4 | 1.4 |
| 1.0 | 3.4 | 0.8 |
| 1.5 | 3.4 | 0.7 |
| 2.0 | 3.4 | 0.75 |
| 3.0 | 3.4 | 0.6 |

Although the FeS precipitation yields relatively good decontamination factors, considerable radioactivity, particularly rare earths, remains in the supernatant solution. While the remaining radioactivity level is sufficiently low to permit handling without the protection of heavy shielding, further decontamination is desirable before discharge to the environment. I find that the remaining radioactivity in the supernate, particularly rare earths, may be effectively removed by co-precipitating $Fe(OH)_2$ and $Ca_3(PO_4)_2$ therein. While satisfactory $Fe(OH)_2$ and $Ca_3(PO_4)_2$ precipitations may be achieved over a wide basic pH range, particularly efficient scavenging may be obtained at approximately pH 8–12, pH 10 being preferred. The pH 4 supernatant solution from the FeS precipitation may be raised to a basic pH value with a variety of inorganic bases, but an alkali hydroxide, particularly NaOH, is preferred. Additional iron need not be added to the supernatant solution to obtain $Fe(OH)_2$ precipitation, since as pointed out previously, the most efficient FeS scavenging is obtained at approximately pH 4, at which pH all the iron is not precipitated as the sulfide. Thus, utilization may be made of the iron remaining in the supernatant solution as the insoluble hydroxide.

Although varying amounts of calcium may be satisfactorily used, I find that the provision of at least approximately 0.1 milligram of calcium per milliliter of solution is particularly satisfactory, while approximately 0.2 milligram calcium per milliliter is preferred. The calcium may be added as any water soluble salt, such as the nitrate, but $CaCl_2$ is preferred.

In some radiochemical wastes, phosphate ion may be already present due to previous chemical processing, and in these solutions further phosphate addition may not be necessary. While the provision of the stoichiometric amount of phosphate ion for $Ca_3(PO_4)_2$ formation is satisfactory, a ten-fold stoichiometric excess is preferred. Thus, the provision of at least approximately 0.15 mg. $PO_4^\equiv$/ml. is satisfactory, while approximately 3 mg. $PO_4^\equiv$/ml. is preferred. Where phosphate addition is necessary, the $PO_4^\equiv$ may be added as any water soluble phosphate salt, such, as for example, an alkali phosphate.

The importance of the proper phosphate concentration in my invention is shown in Table V below.

TABLE V

*The effect of phosphate ion concentration on decontamination*

| Activity | Precipitate | Amount of Phosphate Ion | | |
|---|---|---|---|---|
| | | None (cts./min./ml.) | 320 parts/million (cts./min./ml.) | 3200 parts/million (cts./min./ml.) |
| Initial Activity | | 5,250,000 | 5,250,000 | 5,250,000 |
| Cycle I | FeS | 1,570,000 | 910,000 | 734,000 |
| | $Fe(OH)_2$—$Ca_3(PO_4)_2$ | 708,000 | 522,000 | 4,400 |
| Cycle II | FeS | 520,000 | | 1,920 |
| | $Fe(OH)_2$—$Ca_3(PO_4)_2$ | 409,000 | | 920 |

It is noted that although the stoichiometric amount of phosphate for $Ca_3(PO_4)_2$ formation, 320 parts per million in the above table, yields improved results over precipitation in the absence of $PO_4\equiv$, unpredictably fine decontaminations are obtained with ten times the stoichiometric requirement, 3200 p. p. m. in the above table.

My decontamination process may be satisfactorily conducted at varying temperatures. However, best results may be obtained at approximately 0° C., and temperatures above and below this value result in decreased removal of activity. Table VI, below, shows the effect of temperature after one FeS precipitation and after one complete FeS, $Fe(OH)_2$—$Ca_3(PO_4)_2$ cycle.

TABLE VI

*The effect of temperature on decontamination by ferrous sulfide, ferrous hydroxide, and calcium phosphate precipitations*

| Temperature (° C.) | Activity | |
| --- | --- | --- |
| | After one FeS Precipitation (cts./min./ml.) | After one Cycle (cts./min./ml.) |
| 0 | 463,000 | 42,200 |
| 25 | 552,000 | 128,000 |
| 60 | 786,000 | 294,000 |

One cycle of my above-described decontamination process will generally achieve the excellent average decontamination factor of approximately $10^3$, and will permit relatively safe evaporation of the remaining solution or discharge into rivers or streams. The precipitates may be stored, usually by burial in stainless steel containers. Where higher decontamination factors are desired, the above cycle may be repeated. I find that a second FeS, $Fe(OH)_2$—$Ca_3(PO_4)_2$ cycle will achieve over-all decontamination factors of approximately $10^4$ and a third cycle will yield over-all decontamination factors of approximately $10^5$. For highly radioactive wastes, I prefer to conduct three decontamination cycles. Repeated cycles are particularly effective in removing any remaining cesium-137. Generally, after a three cycle treatment of a high non-radioactive salt-content waste solution (acidic aqueous wastes are frequently neutralized prior to storage or decontamination and considerable non-radioactive salts may be introduced in this manner), the burial volume of the collected precipitates is only approximately 5% of the original volume, which contrasts favorably with 10% for the best of prior art methods.

Ruthenium is among the most difficult of all radioactive fission products to remove from an aqueous solution of nuclear fission products because of its oxidation state and/or complex formation. Although the practice of my invention achieves at least some Ru removal, it may be desired to further increase the efficiency of its removal. I have discovered that treatment of such solutions with hypochlorite ion, particularly an alkali hypochlorite such as NaOCl, unexpectedly vastly improves Ru removal. Thus, in experiments incorporating a hypochlorite treatment after one cycle, a second cycle decontamination factor of the same order as a three cycle decontamination factor without the treatment may be obtained. Although I do not wish to be bound by any reaction mechanism, it is hypothesized that upon treatment with hypochlorite, ruthenium complexes are broken and the ruthenium is oxidized to the +8 state, in which form it is more readily carried by the precipitates.

The hypochlorite treatment may be conducted under varying conditions and varying concentrations while yet achieving better decontamination than is obtainable without it. I prefer, however, to slowly bring the waste solution to boiling in the presence of approximately 10% NaOCl, by volume (5% available chlorine), slowly cool the resulting solution to the ambient atmospheric temperature, and then continue with process treatment. Tables VII, VIII, and IX, below, show the effect of various variables in hypochlorite treatment on decontamination of a waste solution that had previously been through three cycles of the subject process in terms of the activity remaining after a subsequent FeS precipitation.

TABLE VII

*Effect of temperature on hypochlorite treatment* [1]

| Temperature (°C.) | Activity | |
| --- | --- | --- |
| | Initial (cts./min./ml.) | FeS Precipitation After Hypochlorite Treatment (cts./min./ml.) |
| 25 | 45,600 | 21,000 |
| 60 | 45,600 | 15,000 |
| 80 | 45,600 | 15,000 |
| 100 | 45,600 | 3,650 |

[1] 10 percent by volume NaOCl solution (5% available chlorine); mixture kept at temperature specified for 2 minutes and allowed to cool slowly to room temperature before FeS treatment.

TABLE VIII

*Effect of amount of hypochlorite on hypochlorite treatment* [1]

| Amount of Hypochlorite | Activity | |
| --- | --- | --- |
| | Initial (cts./min./ml.) | FeS Precipitation After Hypochlorite Treatment (cts./min./ml.) |
| None | 45,600 | 29,600 |
| 2% | 45,600 | 9,290 |
| 5% | 45,600 | 8,920 |
| 10% | 45,600 | 3,650 |
| 20% | 45,600 | 2,750 |

[1] Boiled for 2 minutes and allowed to cool slowly to room temperature before FeS treatment.

TABLE IX

*Effect of heating method on hypochlorite treatment* [1]

| Heating Method | Activity | |
| --- | --- | --- |
| | Initial (cts./min./ml.) | FeS Precipitation After Hypochlorite Treatment (cts./min./ml.) |
| Quickly Heated to Boil and Quickly Cooled | 45,600 | 7,900 |
| Slowly Heated to Boil and Slowly Cooled | 45,600 | 3,650 |
| Boiled for 30 Minutes and Slowly Cooled | 45,600 | 3,700 |

[1] 10 percent by volume NaOCl solution (5% available chlorine).

Although the hypochlorite treatment may be satisfactorily introduced into the process at varying points, and repeated several times, I find that superior results and greater convenience in operation results from a single treatment at any early stage. Table X, below, illustrates this clearly. Note particularly experiments 4 and 7, which, employing a single NaOCl treatment before the first cycle and after the first cycle, respectively, obtain decontaminations equivalent to those obtained with repeated NaOCl treatments (experiment 1) and profoundly greater than those obtained with a single NaOCl treatment after later cycles (experiments 8–11).

TABLE X

*The effect of number and place of hypochlorite treatments on decontamination of aqueous radioactive waste*

| Cycle | Precipitate | Activity | | | | | |
|---|---|---|---|---|---|---|---|
| | | Exp. 1 (cts./min./ml.) | Exp. 2 (cts./min./ml.) | Exp. 3 (cts./min./ml.) | Exp. 4 (cts./min./ml.) | Exp. 5 (cts./min./ml.) | Exp. 6 (cts./min./ml.) |
| Initial Count | | 5,350,000 | 5,350,000 | 5,350,000 | 5,350,000 | 5,350,000 | 5,350,000 |
| I | Hypochlorite Treatment | Yes | Yes | Yes | Yes | No | No |
| | FeS | 1,200,000 | 1,200,000 | 1,200,000 | 1,200,000 | 1,285,000 | 1,285,000 |
| | Fe(OH)$_2$-Ca$_3$(PO$_4$)$_2$ | 23,000 | 23,000 | 23,000 | 23,000 | 35,400 | 35,400 |
| II | Hypochlorite Treatment | Yes | Yes | Yes | No | Yes | Yes |
| | FeS | 15,100 | 15,100 | 15,100 | 11,260 | 16,240 | 16,240 |
| | Fe(OH)$_2$-Ca$_3$(PO$_4$)$_2$ | 5,790 | 5,790 | 5,790 | 960 | 1,980 | 1,980 |
| III | Hypochlorite Treatment | Yes | Yes | No | No | Yes | Yes |
| | FeS | 4,640 | 4,640 | 3,520 | 800 | 380 | 380 |
| | Fe(OH)$_2$-Ca$_3$(PO$_4$)$_2$ | 276 | 276 | 574 | 384 | 184 | 184 |
| IV | Hypochlorite Treatment | Yes | No | No | No | Yes | No |
| | FeS | 232 | 204 | 396 | 234 | 46 | 104 |
| | Fe(OH)$_2$-Ca$_3$(PO$_4$)$_2$ | 42 | 62 | 114 | 70 | 40 | 168 |

| Cycle | Precipitate | Activity | | | | |
|---|---|---|---|---|---|---|
| | | Exp. 7 (cts./min./ml.) | Exp. 8 (cts./min./ml.) | Exp. 9 (cts./min./ml.) | Exp. 10 (cts./min./ml.) | Exp. 11 (cts./min./ml.) |
| Initial Count | | 5,350,000 | 5,350,000 | 5,350,000 | 5,350,000 | 5,350,000 |
| I | Hypochlorite Treatment | No | No | No | No | No |
| | FeS | 1,285,000 | 1,285,000 | 1,285,000 | 1,285,000 | 1,285,000 |
| | Fe(OH)$_2$-Ca$_3$(PO$_4$)$_2$ | 35,400 | 35,400 | 35,400 | 35,400 | 35,400 |
| II | Hypochlorite Treatment | Yes | No | No | No | No |
| | FeS | 16,240 | 26,200 | 26,200 | 26,200 | 26,200 |
| | Fe(OH)$_2$-Ca$_3$(PO$_4$)$_2$ | 17,900 | 17,900 | 17,900 | 17,900 | 17,900 |
| III | Hypochlorite Treatment | No | Yes | Yes | No | No |
| | FeS | 1,130 | 7,160 | 7,160 | 10,100 | 10,100 |
| | Fe(OH)$_2$-Ca$_3$(PO$_4$)$_2$ | 788 | 2,440 | 2,440 | 9,560 | 9,560 |
| IV | Hypochlorite Treatment | No | Yes | No | Yes | No |
| | FeS | 456 | 1,010 | 2,680 | 1,420 | 7,890 |
| | Fe(OH)$_2$-Ca$_3$(PO$_4$)$_2$ | 104 | 1,590 | 1,840 | 1,110 | 7,430 |

I find that the burial volume of precipitates may be considerably reduced, where a plurality of decontamination cycles are performed, by recycling all iron except the first ferrous sulfide precipitate, which is sent to burial. Briefly, in three cycle processes, the combined third cycle precipitates (sulfide and hydroxide) may be employed as feed for another second cycle ferrous sulfide precipitation by dissolving same with a strong aqueous mineral acid, such as about 12 normal sulfuric acid. The second cycle precipitate (sulfide and hydroxide) together with the hydroxide from the first cycle may be used as feed for the first ferrous sulfide precipitation. When iron is recycled in this manner, it is desirable to have about 0.2 mg./ml. fresh calcium ion for each calcium phosphate precipitation. Although radioactive contaminants are also recycled in this iron recycle method, the decontamination achieved is substantially the same as when fresh iron is added to each cycle, while the burial volume is considerably reduced. Table XI below shows the effect of recycling iron on decontamination.

TABLE XI

*Effect of recycling iron on decontamination*

| Cycle | Precipitate | Activity | |
|---|---|---|---|
| | | Fresh Iron (cts./min./ml.) | Iron Recycled (cts./min./ml.) |
| Initial Count | | 34,000,000 | 34,000,000 |
| I | FeS | 780,000 | 922,000 |
| | Fe(OH)$_2$-Ca$_3$(PO$_4$)$_2$ | 110,000 | 203,000 |
| II | FeS | 8,800 | 11,230 |
| | Fe(OH)$_2$-Ca$_3$(PO$_4$)$_2$ | 3,540 | 4,180 |
| III | FeS | 776 | 1,670 |
| | Fe(OH)$_2$-Ca$_3$(PO$_4$)$_2$ | 296 | 570 |

In a preferred form of my invention, an aqueous solution of uranium fission products may be decontaminated by adjusting said solution to an acidity of approximately pH 1, providing approximately 1 mg. ferrous ion/ml. in the pH 1 solution, adjusting the resulting solution to approximately pH 4 with solid sodium sulfide, separating the resulting FeS precipitate from the resulting supernatant solution, providing approximately 0.2 mg. Ca$^{++}$/ml. and approximately 3 mg. PO$_4^\equiv$/ml. in the separated solution, adjusting the concentration of the resulting supernatant solution to approximately pH 10 with NaOH, separating the resulting supernatant solution from the resulting precipitate, and repeating the above cycle twice with the last named supernatant solution.

The following examples are offered to illustrate my invention in greater detail, and to particularly illustrate its versatility in decontaminating solution of varying fission product spectra.

EXAMPLE 1

The contaminated aqueous waste solution of uranium fission products had the following composition:

TABLE XII

*Radiochemical analysis of waste solution*

| Contaminant | Activity (cts./min./ml.) |
|---|---|
| Gross alpha activity | 860 |
| Gross beta activity | 3.40×10$^7$ |
| Ru$^{106}$ | 3.31×10$^6$ |
| Cs$^{137}$ | 2.69×10$^7$ |
| Sb$^{125}$ | 1.45×10$^5$ |
| Rare earths | 3.60×10$^5$ |
| Zr$^{95}$ | 430,000 |
| Te$^{125}$ | 53,000 |
| Sr$^{89}$ | 432,000 |
| Nb$^{95}$ | 72,000 |
| Total solids | 10 percent. |
| Molarity in nitric acid | 2 molar. |

The above waste solution was adjusted to pH 1 with solid NaOH. The resulting solution was then carefully adjusted to pH 4 with solid Na$_2$S and 1 milligram Fe$^{++}$/milliliter was added as FeSO$_4$, resulting in the precipitation of FeS. The solution was filtered and an analysis made of the filtrate (see A, Table XIII below). The filtrate was then adjusted to pH 10 with solid NaOH, approximately 0.2 milligram Ca$^{++}$/milliliter was added to the filtrate as $CaCl_2$, and 3 mg. per ml. $PO_4$ as $Na_3PO_4$, resulting in the precipitation of $Ca_3(PO_4)_2$ and $Fe(OH)_2$. The solution was filtered and analysis made of the filtrates. (See B, Table XIII below.)

TABLE XIII
*Analysis of filtrates*

| Contaminant | A — Activity Remaining After First FeS Treatment (cts./min./ml.) | B — Activity Remaining After First $Fe(OH)_2$–$Ca_3(PO_4)_2$ Treatment (cts./min./ml.) |
|---|---|---|
| Ru | 15,620 | 15,400 |
| Cs | 21,500 | 22,100 |
| Rare earths | 463,400 | 11,500 |
| Sr | 72,500 | 4,000 |
| Y | 77,400 | 4,000 |
| Total | 655,400 | 62,200 |
| Gross Counts | 692,000 | 66,400 |

The filtrate was adjusted to pH 1 with aqueous $HNO_3$ and the above FeS, $Fe(OH)_2$–$Ca_3(PO_4)_2$ cycle repeated. The total beta count/min./milliliter after the second FeS precipitation was 11,700 and after the second $$FeOH_2-Ca_3(PO_4)_2$$

precipitation 3,060. To the filtrate from the second cycle was added 10% by volume NaOCl solution (5% available Cl). The solution was heated to boiling, and then permitted to cool to room temperature. Another FeS, $Fe(OH)_2$–$Ca_3(PO_4)_2$ cycle was conducted as described above, after which the activity remaining in the filtrate was only 86 counts/min./milliliter. The filtrate was again treated with NaOCl and a fourth precipitation cycle conducted. The final filtrate has a beta count of only 18 counts/min./milliliter which is approximately a background count. The various precipitates were gathered together for final burial. The burial volume was only 5% of the original waste solution.

EXAMPLE 2

Same as Example 1 except that the NaOCl treatment was omitted.

TABLE XIV
*Radiochemical analysis of waste solution*

| Contaminant | Activity (cts./min./ml.) |
|---|---|
| Gross beta | 310,000,000 |
| Ruthenium | 515,000 |
| Cesium | 2,480,000 |
| Antimony and Tellurium | 1,350,000 |
| Rare earths | 171,000,000 |
| Zirconium and Niobium | 1,600,000 |
| Strontium | 1,340,000 |
| pH | 0.1 |
| Percent solids | 12.1 |

TABLE XV
*Results*

| Cycle | Precipitate | Activity (cts./min./ml.) | Overall Decontamination Factor |
|---|---|---|---|
| Initial Count | | 310,000,000 | |
| I | FeS | 552,000 | $5.5 \times 10^2$ |
| | $Fe(OH)_2$–$Ca_3(PO_4)_2$ | 160,000 | $2.0 \times 10^3$ |
| II | FeS | 13,800 | $2.3 \times 10^4$ |
| | $Fe(OH)_2$–$Ca_3(PO_4)_2$ | 10,900 | $2.9 \times 10^4$ |
| III | FeS | 1,920 | $1.6 \times 10^5$ |
| | $Fe(OH)_2$–$Ca_3(PO_4)_2$ | 855 | $3.7 \times 10^5$ |

EXAMPLES 3–5

Same as Example 1 except that the NaOCl treatment was omitted and the $Ca_3(PO_4)_2$ precipitation was not performed until the third cycle.

TABLE XVI
*Radiochemical analysis of waste solutions*

| Contaminant | Example 3 (cts./min./ml.) | Example 4 (cts./min./ml.) | Example 5 (cts./min./ml.) |
|---|---|---|---|
| Gross beta | $2.2 \times 10^{10}$ | $1.6 \times 10^6$ | $2.4 \times 10^7$ |
| Cesium | $1.5 \times 10^9$ | $7.4 \times 10^4$ | $2.7 \times 10^5$ |
| Ruthenium | $3.5 \times 10^9$ | $8.6 \times 10^5$ | $9.9 \times 10^5$ |
| Antimony | $5.1 \times 10^7$ | $1.5 \times 10^4$ | $4.6 \times 10^5$ |
| Zirconium | $1.4 \times 10^8$ | $5.1 \times 10^4$ | $2.2 \times 10^6$ |
| Niobium | $3.2 \times 10^9$ | $1.1 \times 10^5$ | $2.3 \times 10^6$ |
| Rare earths | $7.0 \times 10^9$ | $2.6 \times 10^4$ | $4.5 \times 10^5$ |
| Strontium | $5.3 \times 10^9$ | $1.0 \times 10^3$ | $7.8 \times 10^4$ |
| Tellurium | $3.8 \times 10^8$ | $2.2 \times 10^4$ | $7.5 \times 10^4$ |
| Plutonium (Alpha) | $6.0 \times 10^5$ | $6.0 \times 10^3$ | $3.5 \times 10^5$ |
| Iron content | 0.1 mg./ml. | 1.0 mg./ml. | 4.0 mg./ml. |
| Acidity | 2 M $HNO_3$ | 2 M $HNO_3$ | 5 M $HNO_3$ |

TABLE XVII
*Results*

| Cycle | Precipitate | Example 3 (cts./min./ml.) | Example 4 (cts./min./ml.) | Example 5 (cts./min./ml.) |
|---|---|---|---|---|
| Initial Count | | 220,000,000 | 1,600,000 | 24,000,000 |
| I | FeS | 110,000,000 | 41,000 | 58,000 |
| | $Fe(OH)_2$ | 170,000 | 24,000 | 21,000 |
| II | FeS | 32,000 | 8,200 | 5,800 |
| | $Fe(OH)_2$ | 7,200 | 5,100 | 1,900 |
| III | FeS | 4,600 | 1,900 | 1,900 |
| | $Fe(OH)_2$ | 1,700 | 1,300 | 1,000 |
| | $Ca_3(PO_4)_2$ | 564 | 324 | 194 |

EXAMPLES 6–8

Same as Example 1, except as shown in Table XVIII below.

TABLE XVIII
*Results*

| Cycle | Precipitate | Example 6 (cts./min./ml.) | Example 7 (cts./min./ml.) | Example 8 (cts./min./ml.) |
|---|---|---|---|---|
| Initial Count | | 30,000,000 | 176,000,000 | 480,000,000 |
| I | FeS | 1,850,000 | 10,700,000 | 101,000,000 |
| | $Fe(OH)_2$–$Ca_3(PO_4)_2$ | 95,500 | 1,150,000 | 7,660,000 |
| | Hypochlorite Treatment | No | No | No |
| II | FeS | 51,800 | 278,000 | 2,830,000 |
| | $Fe(OH)_2$–$Ca_3(PO_4)_2$ | 29,400 | 81,000 | 1,990,000 |
| | Hypochlorite Treatment | No | No | Yes |
| III | FeS | 22,900 | 69,000 | 8,520 |
| | $Fe(OH)_2$–$Ca_3(PO_4)_2$ | 19,300 | 53,000 | 5,040 |
| | Hypochlorite Treatment | Yes | Yes | Yes |
| IV | FeS | 1,400 | 1,820 | 2,300 |
| | $Fe(OH)_2$–$Ca_3(PO_4)_2$ | 770 | 370 | 1,600 |

The above examples are intended to show the versatility of my invention in decontaminating solutions of nuclear fission products of widely different fission product spectra. Different spectra are due in part to the age of the waste solution (some fission product solutions are stored for several years to permit decay of relatively short-lived fission products) and to the previous chemical processing history. It should also be understood that procedural variations may be made without departing from the spirit of my invention. In this regard, Examples 3–5 show the two $FeS$—$Fe(OH)_2$ precipitations may be conducted before a single $Ca_3(PO_4)_2$ precipitation, although, of course, $Ca_3(PO_4)_2$ precipitation is ultimately necessary for efficient decontamination. Likewise, other changes, such as several $FeS$ precipitations before a single $Fe(OH)_2$—$Ca_3(PO_4)_2$ precipitation may be made, as well as NaOCl treatments at different points in the cycles. My invention, therefore, should be understood to be limited only as is indicated by the appended claims.

Having thus described my invention, I claim:

1. A process for the decontamination of an aqueous solution of nuclear fission products, which comprises a plurality of cycles, each of said cycles comprising precipitating FeS in said solution at approximately pH 4, separating the resulting supernatant solution from the resulting precipitate, precipitating $Fe(OH)_2$ and $Ca_3(PO_4)_2$ in the separated supernatant solution at approximately pH 10, separating the resulting supernatant solution from the resulting precipitate, and before at least one of said cycles contacting the last-named supernatant solution with hypochlorite ion.

2. A process for the decontamination of an aqueous solution of uranium fission products, which comprises effecting a plurality of cycles, each of said cycles comprising adjusting said solution to an acidity of approximately pH 1, providing at least approximately 0.5 mg. ferrous ion/milliliter, adding alkali sulfide to the resulting solution until approximately pH 4 is obtained, separating the resulting supernatant solution from the resulting FeS precipitate, providing at least approximately 0.1 mg. calcium ion/ml., and at least approximately 0.15 mg. phosphate ion/ml., adjusting the resulting solution to approximately pH 10 with alkali hydroxide, separating the resulting supernatant solution from the resulting $FeS(OH)_2$—$Ca_3(PO_4)_2$ precipitate and before at least one of said cycles bringing the supernatant solution to boiling together with approximately 10% NaOCl, by volume, and cooling the resulting solution to the ambient atmospheric temperature.

References Cited in the file of this patent

UNITED STATES PATENTS

| | | |
|---|---|---|
| 1,276,644 | Goldschmidt | Aug. 20, 1918 |
| 1,633,621 | Blumenfeld | June 28, 1927 |
| 2,234,786 | Walsh | Mar. 11, 1941 |

OTHER REFERENCES

Christenson et al.; Ind. Eng. Chem., July 1951, vol. 43, No. 7, pp. 1509–16.

Rudolfs: Industrial Wastes, A. C. S. Monograph Series No. 118, pp. 456–61, 1953, Reinhold Pub. Corp., New York.